F. H. NETT.
NUT LOCK.
APPLICATION FILED MAY 25, 1910.

975,985.

Patented Nov. 15, 1910.
2 SHEETS—SHEET 1.

Witnesses
Frank Hough
U. B. Hillyard.

Inventor
Fred H. Nett,
By Victor J. Evans
Attorney

F. H. NETT.
NUT LOCK.
APPLICATION FILED MAY 25, 1910.
975,985.
Patented Nov. 15, 1910.
2 SHEETS—SHEET 2.
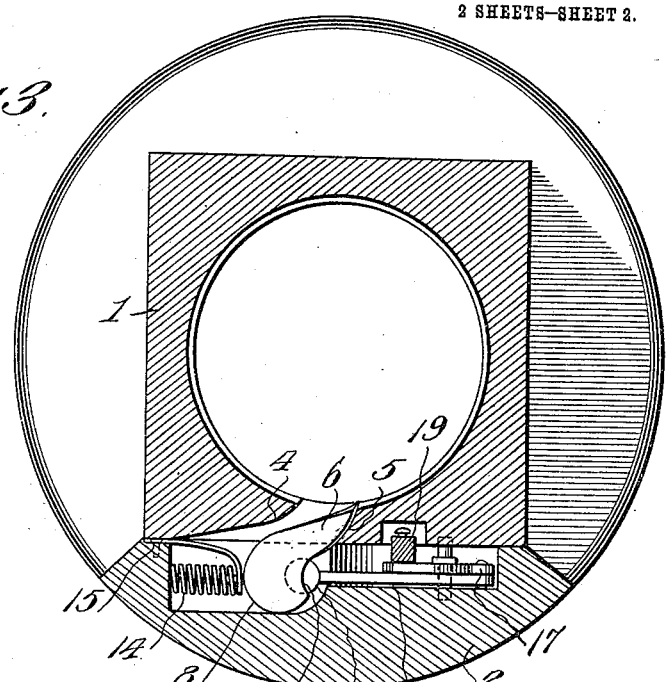
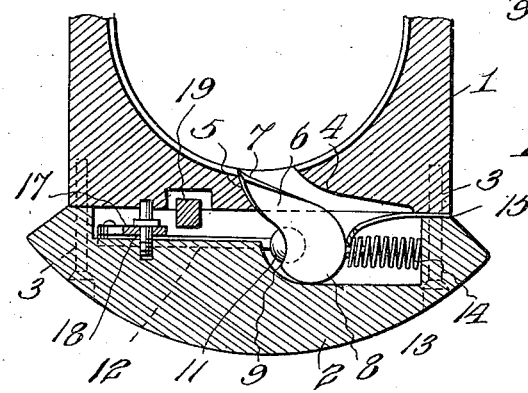
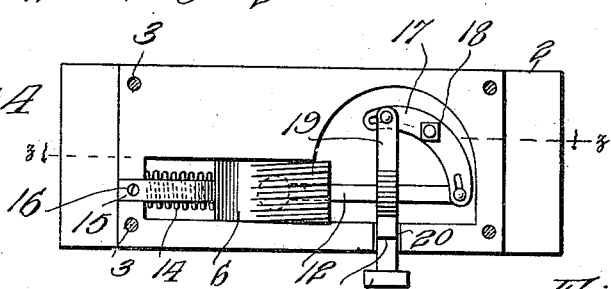
Witnesses
Frank Hough
V. B. Hillyard
Inventor
Fred H. Nett,
By Victor J. Evans
Attorney

UNITED STATES PATENT OFFICE.

FRED H. NETT, OF RIALTO, CALIFORNIA.

NUT-LOCK.

975,985.

Specification of Letters Patent.  Patented Nov. 15, 1910.

Application filed May 25, 1910. Serial No. 563,321.

*To all whom it may concern:*

Be it known that I, FRED H. NETT, a natural born citizen of the United States, residing at Rialto, in the county of San Bernardino and State of California, have invented new and useful Improvements in Nut-Locks, of which the following is a specification.

The present invention provides means for securing a nut against rotation after being tightened, the invention being particularly adapted for axle nuts to secure the same upon the axle arms or spindles against rotation in either direction, thereby preventing binding of the wheel or loosening of the nut.

The invention consists of the novel features, details of construction and combination of parts, which hereinafter will be more particularly set forth, illustrated in the accompanying drawings, and pointed out in the appended claims.

Figure 1:
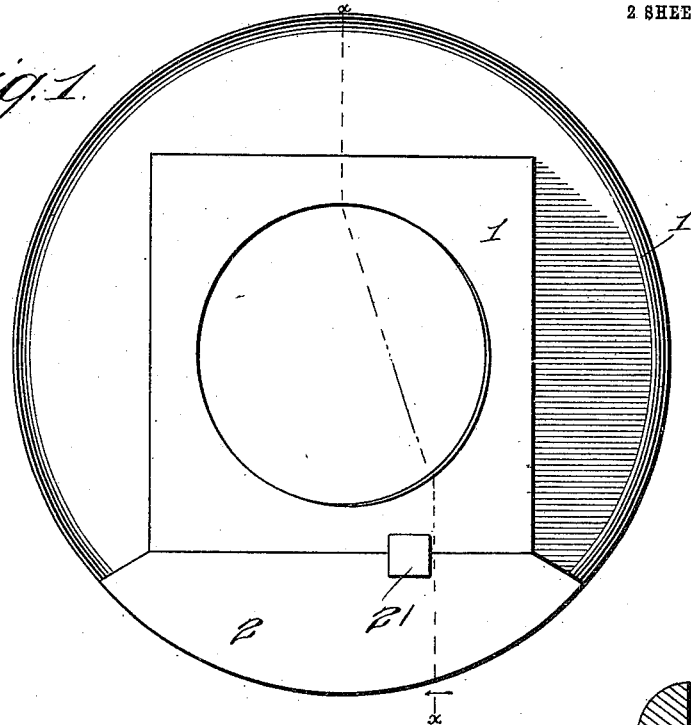
Figure 6:
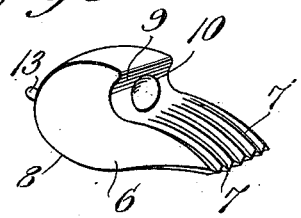
Figure 7:
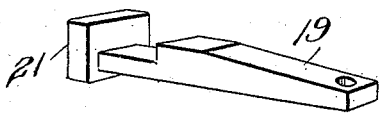
Figure 2:
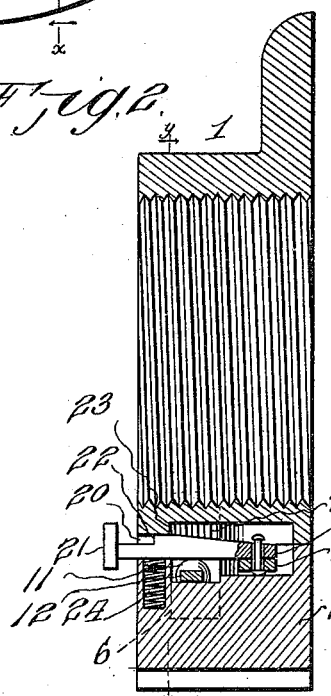

Referring to the drawings, forming a part of the application, Figure 1 is a front view of an axle nut provided with lock means embodying the invention. Fig. 2 is a section on the line $x-x$ of Fig. 1. Fig. 3 is a section on the line $y-y$ of Fig. 2. Fig. 4 is a plan view of the lower section of the nut. Fig. 5 is a section of the complete nut on the line $z-z$ of Fig. 4, the upper portion of the nut being broken away. Fig. 6 is a perspective view of the dog inverted. Fig. 7 is a perspective view of the push bar.

Corresponding and like parts are referred to in the following description, and indicated in all the views of the drawings, by the same reference characters.

The nut comprises two sections 1 and 2, designated respectively as the upper and the lower sections, the two sections being secured by suitable fastening means such as machine screws 3, which have their heads countersunk in the lower section and their body portions fitted into threaded openings formed in the section 1. The upper section 1 comprises an annular body portion and a basal flange portion and is formed with an opening which is internally threaded to receive the threaded end of the spindle or axle arm or other part for which the nut is designed. The lower portion of the section 1 has an opening 4, which communicates with the threaded opening of the nut and extends through the lower face of the section. One wall of the opening 4 is abrupt, whereas the other wall is inclined and formed with thread sections 5, which form parts of the screw threads of the main opening. The opening 4 is designed to receive the tapered end of a dog 6 and which tapered end is formed upon opposite sides with thread sections 7 to correspond with the thread sections 5 and the screwthreads of the axle or other part to which the nut may be fitted. It is to be understood that the dog 6 has a two-fold movement, namely, a pivotal movement and a longitudinal movement. When the nut is in position upon an axle or other part a wedge-shaped space is formed between the part receiving the nut and the inclined wall 5 of the opening 4 and in practice the tapered end of the dog 6 is forced into this space and operates by a wedging action to secure the nut against movement in either direction. The wedging and binding action of the nut is materially increased by reason of the thread sections 7 upon opposite sides of the tapered end of the dog and which thread sections coöperate with screwthread portions of the nut and the part upon which the nut is fitted.

The lower section 2 is recessed in its upper side to receive the dog 6 and adjunctive parts. The open side of the recess is closed by the lower face of the section 1 when the parts 1 and 2 are placed together and made secure by the fastenings 3. The heel end 8 of the dog 6 is made rounding and formed upon its under side with an abutment 9 in which a socket 10 is provided to receive the ball 11 formed at one end of a push bar 12. A pin 13 projects outwardly from the heel end 8 of the dog 6 and serves to center a helical spring 14 and a flat spring 15, the latter being secured at one end, as indicated at 16, to the section 2 beyond the recess formed therein. The inner end of the spring 15 is bent downward about at a right angle and is pierced to receive the pin 13 which extends therethrough. The spring 15 serves to press the heel end of the dog downward and to throw the tapered or toe end of said dog upward into engagement with the threaded part upon which the nut may be fitted, the dog 6 turning upon the rounded end 11 of the push bar 12. The helical spring 14 is of the expansible type and is located below the spring 15 and confined between the heel end of the dog 6 and one end of the recess in which the said dog is located. The spring 14 normally serves to press the dog 6 forward to cause the tapered end thereof to enter the wedge-shaped space formed between the inclined part 5 of the opening 4 and the part upon which the nut may be placed.

The push bar 12 is provided at one end with a ball 11, which fits the socket 10 of the dog 6 and its opposite end is connected to one arm of a bell crank 17, which is pivoted at 18, the pivot fastening having one end threaded into the section 2 and its opposite end entering an opening in the section 1 and said pivot fastening having a shoulder between its ends to overlap the bell crank and retain the same in place. An operating bar 19 is connected at its inner end to the other arm of the bell crank 17 and extends through an opening 20 formed between the meeting faces of the sections 1 and 2, the outer end of the operating bar having a head 21. A shoulder 22 is provided upon the upper edge of the bar 19 near its outer end and is adapted to engage a corresponding shoulder 23 formed upon the section 1 so as to hold the operating bar 19 when pressed inward. A spring 24 normally exerts an upward pressure upon the bar 19, so that when said bar is pressed inward and its shoulder 22 clears the shoulder 23 the bar is pressed upward by means of the spring 24 to cause the shoulder 22 to engage the shoulder 23 and hold the bar 19 pressed inward. When the operating bar 19 is pressed inward the push bar 12 is moved in a direction to withdraw the tapered end of the dog 6 from wedging engagement with the nut and the part upon which the nut is fitted, so that the nut may either be removed or tightened. After the nut has been adjusted the operating bar 19 is moved to disengage its shoulder 22 from the shoulder 23 when the springs 14 and 16 come into play to move the dog 6 forward into the tapered recess so as to bind upon both the threaded parts of the nut and the part upon which the nut may be placed, thereby firmly securing the nut in the adjusted position.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. In a nut lock the combination of a nut having a threaded opening and having an opening at one side of the threaded opening, a dog located in the side opening of the nut and having both a pivotal and a sliding movement therein and having a tapered end, a movable fulcrum for said dog, a spring normally exerting a pressure upon the dog to press the same forward to cause it to operate by a wedging action for securing the nut, and means for moving the fulcrum of the dog against the tension of the spring to withdraw the dog from active position.

2. In a nut lock the combination of a nut having a threaded opening and having a side opening provided with an inclined wall having screwthread sections corresponding with the screwthreads of the main opening of the nut, a dog located in said side opening and having a tapered end formed upon opposite sides with screwthread sections to match the screwthreads of the nut and the part upon which the nut may be fitted, a spring normally exerting a pressure upon the dog to force the same forward to cause it to operate by a wedging action, and means for moving the dog against the tension of said spring to withdraw said dog from active position.

3. In a nut lock the combination of a nut having a threaded opening and provided with a side opening in communication with the threaded opening, a push bar, a dog located in said side opening and mounted upon the bar to move therewith and to tilt thereon, a spring normally exerting a pressure upon the dog to hold the same in operative position, means for moving said push bar to effect longitudinal movement of the dog in opposition to the tension of the spring to throw the dog out of active position, and means for holding said bar when moved whereby the nut may be easily placed in position or removed from the part with which it coöperates.

4. In a nut lock the combination of a nut having a threaded opening and a side opening in communication with said threaded opening, a push bar mounted upon the nut, operating means for the push bar, a dog located in said side opening and mounted upon the push bar to move therewith and to tilt thereon, and a spring normally exerting a pressure upon the dog to throw the active end of the dog into the threaded opening of the nut.

5. In a nut lock the combination of a nut having a threaded opening and a side opening in communication with the threaded opening, a dog located in the side opening and mounted to move both longitudinally and pivotally, a spring for exerting an endwise pressure upon the dog to move the same longitudinally, and a second spring normally exerting a lateral pressure upon the dog to effect a tilting thereof.

6. In combination a nut having a threaded opening and a side opening in communication with the threaded opening, a dog arranged in the side opening and having a tapered end and a heel end, the latter formed with an abutment provided with a socket, a push bar having a rounded end fitted in said socket, and a spring normally exerting a pressure upon the dog to hold the same in engagement with the rounded end of the push bar.

7. In a nut lock the combination of a nut having a threaded opening and a side opening in communication with the threaded opening, a dog arranged in the side opening and adapted to receive both a pivotal and a longitudinal movement, a push bar having one end in engagement with said dog, a spring normally exerting a pressure upon the dog in opposition to the push bar, an operating bar for actuating the push bar to throw the dog out of operative position, coöperating stops to hold the operating bar when pressed inward, and a spring exerting a lateral pressure upon the operating bar to bring the stop shoulders into play when the operating bar is pressed inward to given position.

In testimony whereof I affix my signature in presence of two witnesses.

FRED H. NETT.

Witnesses:
E. M. LASH,
C. M. HUSTON.